INVENTOR.
VERNON C. HINES
BY
Richard W. Law
ATTORNEY

United States Patent Office
3,605,232
Patented Sept. 20, 1971

3,605,232
METHOD OF LINING FLEXIBLE METAL L'S
Vernon C. Hines, 2915 S. Lafayette Drive,
Denver, Colo. 80210
Filed Feb. 17, 1969, Ser. No. 799,618
Int. Cl. B21d *53/00;* B21k *29/00;* B23p *15/26*
U.S. Cl. 29—157.4
10 Claims

ABSTRACT OF THE DISCLOSURE

The method of lining a 90° elbow made of flexible, metal convolute tubing initially bends a length of flexible convolute tubing into a 90° L-shape, a wire braid covering is then stretched over the outside of the L and welded in place holding the tubing in the L-shape, filling the internal convolutes with the flexible resilient material, removing excess flexible material to expose the apex of the metal convolutes, inserting a removable mandrel in the L, filling the annulus around the mandrel with additional flexible resilient material, and then curing all the flexible material to bond the two materials together and to the metal.

---

The transportation of fluids in pipes and tubes involves considerable stress shock to the material of the pipe or tubes on large or sudden changes in pressure, temperature and flow velocity of the fluid. Additionally where pumps are utilized in the piping system vibration induces direct and/or resonance shock to the metal of the pipe or tubing. In a similar manner, various fittings in the conduit structure may induce more vibrational stress into the system. The types of movements induced in a piping system include direct longitudinal, lateral and torsional stresses, as well as vibrational movement, all of which induce some stress on the piping system. Convolute flexible metal pipe has been used in many such systems, as means to in some measured dampen the induced movements of the piping system, as well as dampen induced resonance built up as a result of the various movements. In many installations, the use of a straight section of flexible metal hose is not as advantageous as the use of a flexible hose bent in the shape of an L, usually 90°.

Most convolute metal hoses have an irregular inner surface which drastically changes the flow characteristics of the fluid flowing from a smooth bore pipe and passing into the metal convolute pipe or vice versa. By lining the inner recesses with various flexible materials to provide a smooth inner surface, friction and turbidity is substantially reduced. A filled convolute metal flexible pipe has been proposed in the prior art, for example Swedish Pat. No. 132,558 patented Aug. 18, 1947. In the patent it is stated that a flexible metal pipe is provided with an inner layer of rubber or other synthetic material. It is then further stated that the pipe is easily bent, the drawing illustrating a 90° L. Considerable experience has shown it is not possible to take a length of flexible corrugated or convoluted pipe, fill the inner convolutes to form a smooth bore with a flexible resilient material and then bend the pipe into a usable 90° L. On bending a length of filled convolute pipe, the material on the inner side is forced out of the convolutes and on the other side the material is stretched and easily pulls away from the metal. Since rubber is substantially incompressible, the inside of the bend wrinkles destroying the smooth bore of the straight convolute pipe. Additionally, there is no disclosure of any kind in the patent of a method for making the internally filled corrugated pipe in the shape of an L. Experience has shown that by filling the convolutes of the metal pipe, the flexibility of the pipe is drastically reduced as the fill-in material in the convolutes reduces the normal function of the convolutes on bending. It is easily seen that when a convolute metal pipe is bent, the convolutes on the inside of the bend move together while the convolutes on the outside stretch apart and filling the convolutes disrupts these movements. A usable length of flexible convolute metal pipe filled with a flexible material in the inside convolutes cannot be bent into a 90° angle.

According to the present invention, I provide a method of preparing a 90° elbow of flexible corrugated metal pipe filled with a resilient material having a smooth bore for the transportation of fluids. The method involves initially bending a flexible metal corrugated or convoluted pipe into an L of short radius, fitting a wire braid covering over the L and welding the covering to the end fittings of the L to maintain the metal pipe in the 90° L configuration. A soft resilient material, for example, rubber, synthetic resin, or the like, is then filled into all the convolutes by any convenient means, which includes pouring a fluid material in the L and permitting the material to set so that it fills the convolutes. The excess resilient material is then removed down to expose the metal at the apex of the convolute. A lining of resilient material, to provide a smooth bore through the L, is then placed in the L, and this lining is bonded to the other resilient material and to the exposed metal in a curing process. The second lining may be placed in the L as by using a tube of the flexible material or by using a mandrel and then filling the annulus with fluid flexible material, which is then cured to bond the same to the resilient material in the convolutes and to the metal, leaving a smooth bore through the L. The lining material may, also be extended over the end fittings (usually for flanged fittings) to provide a dielectric connection, such as are being used more and more in piping systems to isolate and insulate the scystem from electrical conduction therealong.

Included among the objects and advantages of the present invention is a method for making a formed 90° L from a flexible material filled metal convolute pipe.

Another object of the invention is to provide a method of producing a right angle L of a flexible material lined convolute metal pipe arranged to retain its shape and still provide a smooth flow passage therethrough.

A further object of the invention is to provide a method for producing a permanent L-shaped, metal convolute pipe having a smooth, flexible material flow path and arranged for dielectric connection in a piping system.

These and other objects and advantages of the invention may be readily ascertained by referring to the following description and appended illustrations in which:

FIG. 3 is a fragmentary, side elevation in section, of a convolute metal L, illustrating a step of filling the convolutes of the L with a resilient material;

Figure 1:
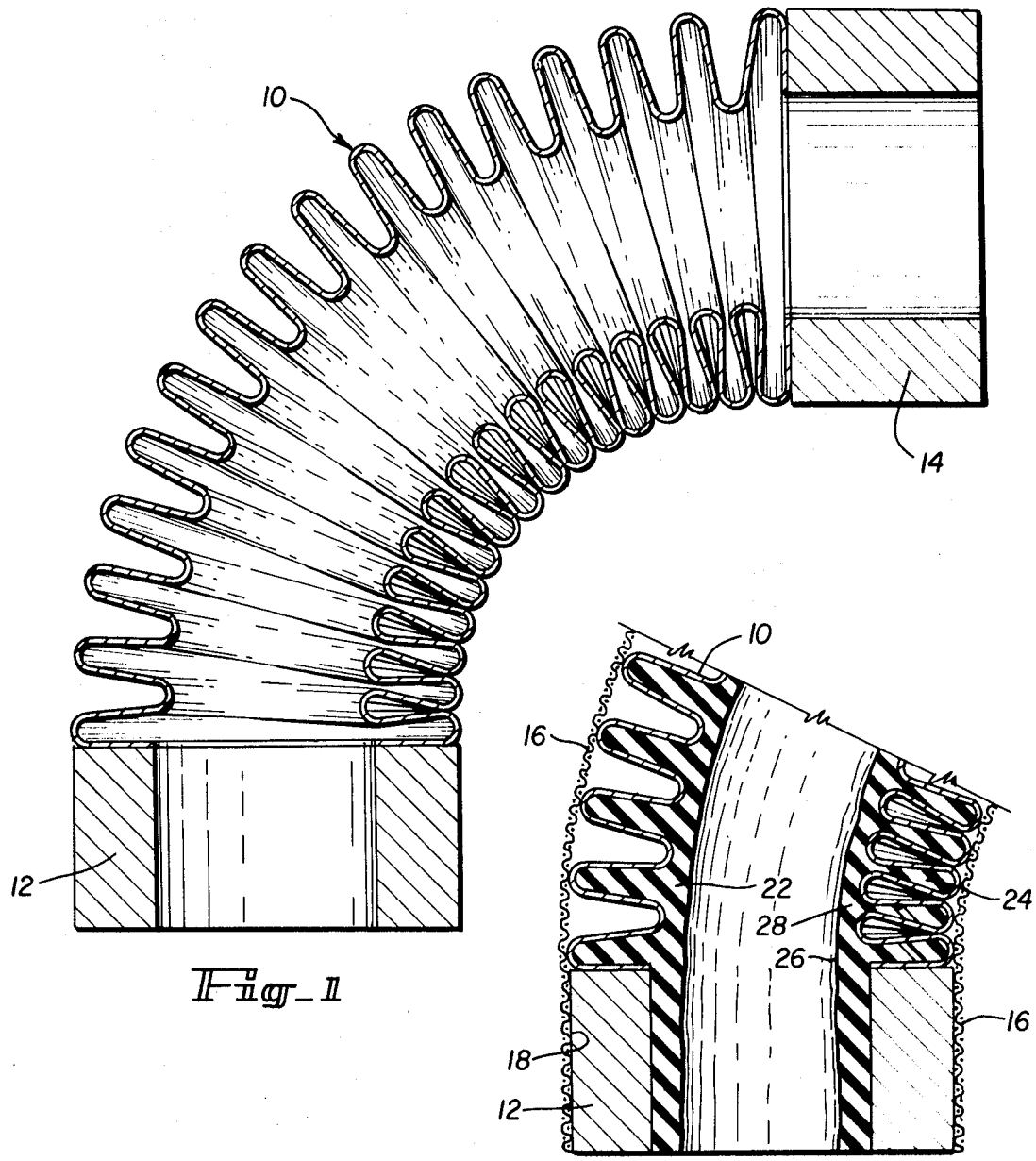
FIG. 1 is a cross-sectional, side elevational view of a metal convolute pipe formed into an L and provided with nipples for attachment to piping systems.

In the method illustrated in the drawings, a metal convolute pipe 10, formed of such metals such as copper, brass, stainless steel, aluminum, and other metals, is provided with end fittings or nipples 12 and 14 welded to the ends of the convolute. The pipe is then bent into about a 90° angle. This is the first step in the production of the flexible L. The fitting on each end of the convolute tube may be any desired, such as a threaded nipple, a welded nipple, a flanged nipple, etc., depending upon the connections of the piping system. The size of convolute pipe normally extends from about ¾ of an inch to about 12 inches, and the radius of the curve of the L is approximately that of an L for a standard pipe of that diameter.

Figure 2:
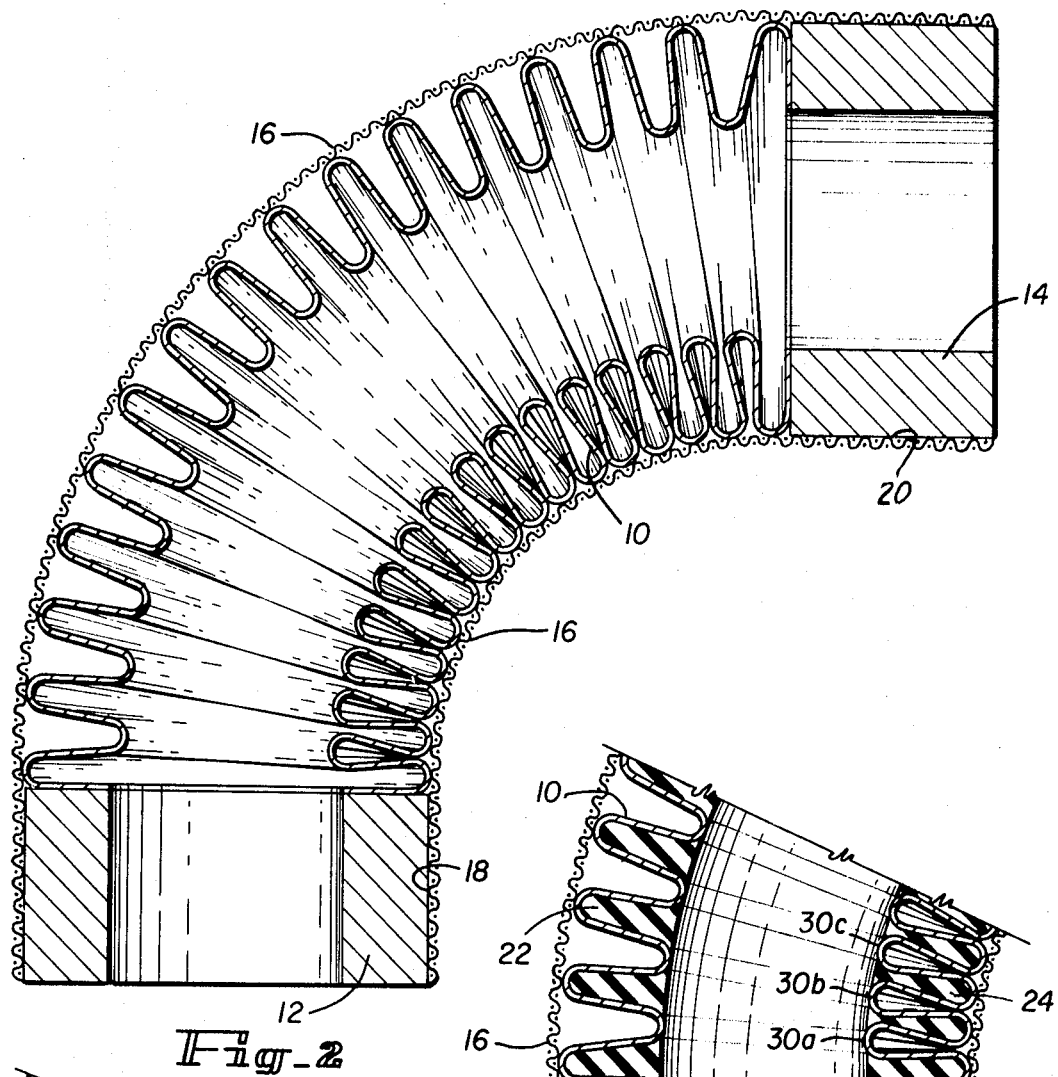
FIG. 2 is a cross-sectional, side elevational view showing a first step in forming a metal convolute tube formed into an L.
Figure 4:
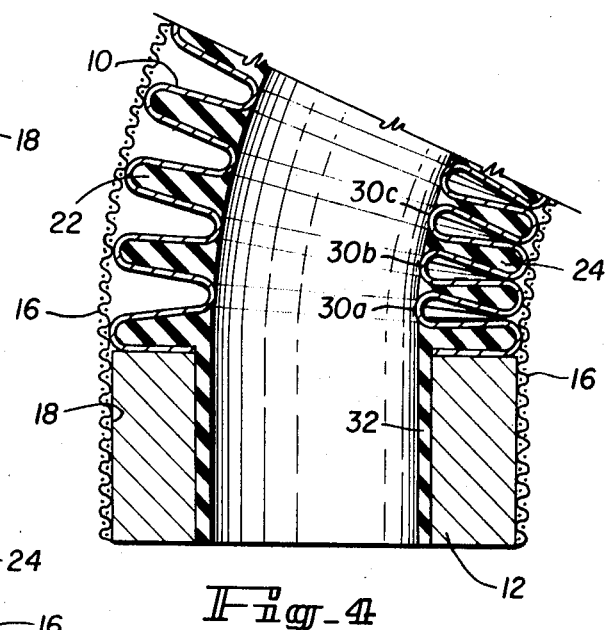
FIG. 4 is a fragmentary, side elevation in section, of a subsequent step of forming a filled convoluted L-shaped pipe.
Figure 5:
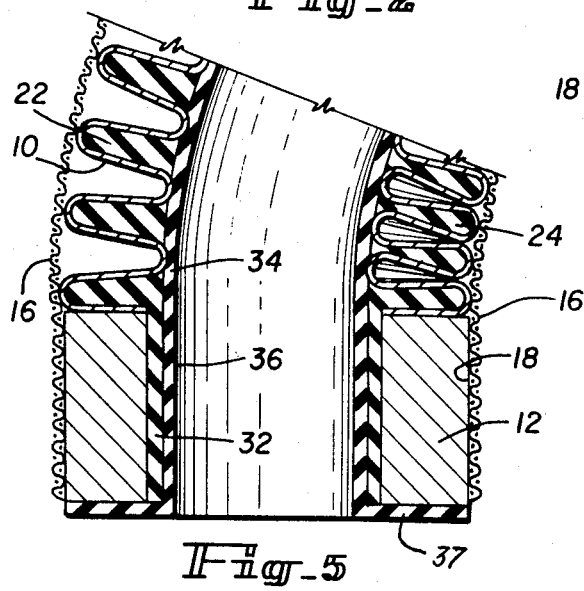
FIG. 5 is a fragmentary side elevation, in cross-section, of one of the final steps of forming a filled convolute L-shaped pipe.

The second step in the process in the manufacturing the L is illustrated in FIG. 2, wherein a wire braid covering 16 is stretched tightly over the L to conform generally to the configuration of the L. The wire braid in then welded or otherwise securely attached to the nipples 12 and 14 as 18 and 20, which retains the convolute pipe in the L configuration. In the next step of the method, the interior convolutes are filled with a plastic material 22, FIG. 3, which may be any of those listed below, and one convenient method of filing the convolutes is to pour liquid material into the L. The material is permitted to set so that it fills the internal convolutes, including the outside and inside of the bend, and extending the filling internally of L. This procedure normally leaves a rough surface 26 on the interior of the L with some of the resilient flexible material 28 extending above the apex of the metal convolutes. The next stage of the method removes the excess flexible material, illustrated in FIG. 4, so that the apex 30a, 30b, 30c etc. are exposed on the interior of the pipe, and normally leaving a thin layer 32 of the flexible material in the nipples. The excess material may be removed by grinding, cutting, scraping or the like. The next step of the procedure is to provide a layer 34 in the L having a smooth interior surface 36, and this layer is then cured and bonded to the resilient material in the convolutes and in the nipples. Curing, also, bonds the material to the metal of the L-shaped corrugated pipe.

The materials for filling the convolute L's are quite extensive, some of the materials that may be used includes rubbers, both natural and synthetic; butadienes, neoprenes, chloroprenes; reinforced rubbers with such reinforcing as glass, asbestos, fabric, and the like; various elastomeric organic plastic resins which includes polyamides, polyethylene, polypropylene, various vinyls and vinyl copolymers, fluorohydrocarbons, silicones, and the like.

After the flexible metal pipe has been filled with the fluid material in the step of filling the convolutes the fluid material is cured into a flexible resilient essentially solid material such as rubber, synthetic plastic, and the like. The means of curing is, of course, determined by the material itself. Where the material is rubber or latex, heat will cure the rubber into a solid material filling the convolutes. Where the material is a plastic dissolved in a solvent, a small amount of heat to vaporize the solvent leaves a plastic filling the convolutes. Other curing means may be used according to standard procedures. After the excess resilient material is removed, a flexible mandrel may be placed in the L, usually one part from each end, and with a diameter slightly less than the minimum diameter, of the flexible convolute tube, leaving an annulus around the mandrel. Fluid material is then injected into the annulus and this is cured, according to the composition of the material, for polymerizing the liquid material to a solid. The material filling the convolutes may be the same or a different material than the inner pipe lining depending upon the use to which the L is to be placed, for example, the convolutes may be filled with a foamed plastic and the lining formed of an unfoamed plastic compatible and bondable with the foamed plastic to thereby provide insulating qualities for the L and still provide a smooth bore for the passage of fluid through the L.

In those cases where the system is an electrically shielded system, the inside covering 36 may be extended around the end of each nipple to form a flat gasket 37. This is bonded to the metal by curing to provide a dielectric seal with the adjacent fitting member of the piping system.

When prepared according to the invention, the L provides a small amount of movement axially of the nipples of the L, i.e. along the axis of each nipple, laterally of the flow passage, and, also, torsionally of the L to provide damping against thermal, shock, vibration, misalignment, noise, temperature, flow and pressure changes, etc. The unit retains its 90° L shape, but provides reasonably good degrees of freedom of movement of the system.

I claim:
1. A method of lining a 90° elbow formed of metal convolute tubing, comprising attaching end fittings to a length of flexible, metal convolute tubing; bending said length of flexible metal convolute tubing into about a 90° L; stretching braided wire tubular covering over said convolute tubing; securing said braided covering to said end fittings to maintain said L in said about 90° configuration; filling the internal convolutes of said tubing with a flexible resilient material; removing excess flexible material to expose the inner apex of each metal convolute and leave the convolutes full of the material; forming an internal layer of flexible resilient material in said tubing with a smooth, internal wall; and curing said flexible resilient materials to bond them together and to the metal of said tubing.

2. A method of lining a 90° elbow according to claim 1 wherein said braided covering is welded to said end fittings.

3. A method of lining a 90° elbow according to claim 1 wherein flexible resilient material for filling said convolutes is a liquid when filling said convolutes and is set prior to removing excess material.

4. A method of lining a 90° elbow according to claim 1 wherein a mandrel is placed in said L prior to pouring liquid flexible resilient material therein to fill the annulus between the L and the mandrel to thereby form said smooth internal wall.

5. A method of lining a 90° elbow according to claim 1 wherein a length of flexible resilient tubing is inserted in said L and on curing said tubing bonds with the material filling said convolutes and said metal.

6. A method of lining a 90° elbow according to claim 1 wherein the flexible resilient material is the same type of material as the material of said internal layer of flexible resilient material.

7. A method of lining a 90° elbow according to claim 1 wherein the flexible resilient material filling said convolutes is a different material than the material of said internal wall but is bondable therewith.

8. A method of lining a 90° elbow according to claim 1 wherein the material filling said convolutes is a rubber and is cured by heat prior to removal of the excess material.

9. A method of lining a 90° elbow according to claim 1 wherein the material filling said convolutes is a synthetic plastic.

10. A method of lining a 90° elbow according to claim 1 wherein the material filling said convolutes is a foamable synthetic plastic compatible and bondable with the material of said internal wall.

References Cited

UNITED STATES PATENTS

| | | | |
|---|---|---|---|
| 864,167 | 8/1907 | Hinsky | 138—121 |
| 2,852,216 | 9/1958 | Peters | 138—121 |
| 3,028,291 | 4/1962 | Roberts | 138—121 |
| 3,037,798 | 6/1962 | Cooper | 138—121 |
| 3,043,612 | 7/1962 | Pavlik | 138—121 |
| 3,076,737 | 2/1963 | Roberts | 138—121 |
| 3,374,856 | 3/1968 | Wirt | 138—121 |

FOREIGN PATENTS 1,128,973   5/1962   Germany.

JOHN F. CAMPBELL, Primary Examiner

D. P. ROONEY, Assistant Examiner

U.S. Cl. X.R.

138—121